United States Patent [19]

Vernon et al.

[11] Patent Number: 4,557,960
[45] Date of Patent: Dec. 10, 1985

[54] PRESSURE SENSITIVE ADHESIVE TRANSFER TAPE CONTAINING ORGANIC FILAMENTS

[75] Inventors: Caroline L. Vernon, Stillwater; Earl A. Stanek, St. Croix Beach, both of Minn.

[73] Assignee: Minnesota Mining and Manufacturing Co., St. Paul, Minn.

[21] Appl. No.: 558,818

[22] Filed: Dec. 7, 1983

[51] Int. Cl.⁴ .............................. C08F 2/50; C09J 7/02
[52] U.S. Cl. ...................................... 428/40; 428/303; 428/345; 428/359; 427/54.1; 427/208.4; 427/385.5; 156/275.5; 156/279; 156/332; 204/159.22; 526/319; 526/328
[58] Field of Search ................. 428/395, 396, 40, 338, 428/352, 355, 303, 345, 359; 523/202, 222, 300; 156/275.5, 279, 332; 427/54.1, 208.4, 146, 385.5; 204/159.16, 159.22; 526/319, 328

[56] References Cited

U.S. PATENT DOCUMENTS

| | | | |
|---|---|---|---|
| Re. 24,906 | 12/1960 | Ulrich | 206/59 |
| 2,889,038 | 6/1959 | Kalleberg | 206/59 |
| 3,062,683 | 11/1962 | Kalleburg et al. | 117/122 |
| 3,677,788 | 7/1972 | Zirnite | 428/352 X |
| 3,684,645 | 8/1972 | Temple et al. | 428/338 X |
| 4,181,752 | 1/1980 | Martens et al. | 427/54.1 |
| 4,223,067 | 9/1980 | Levens | 428/308 |
| 4,303,485 | 12/1981 | Levens | 204/159.24 |
| 4,329,384 | 5/1982 | Vesley et al. | 428/40 |
| 4,330,590 | 5/1982 | Vesley | 428/336 |

FOREIGN PATENT DOCUMENTS 1282421  7/1972  United Kingdom ............... 428/395

*Primary Examiner*—Joseph L. Schofer
*Assistant Examiner*—Fred M. Teskin
*Attorney, Agent, or Firm*—Donald M. Sell; James A. Smith; Richard E. Brink

[57] ABSTRACT

Figure 2:
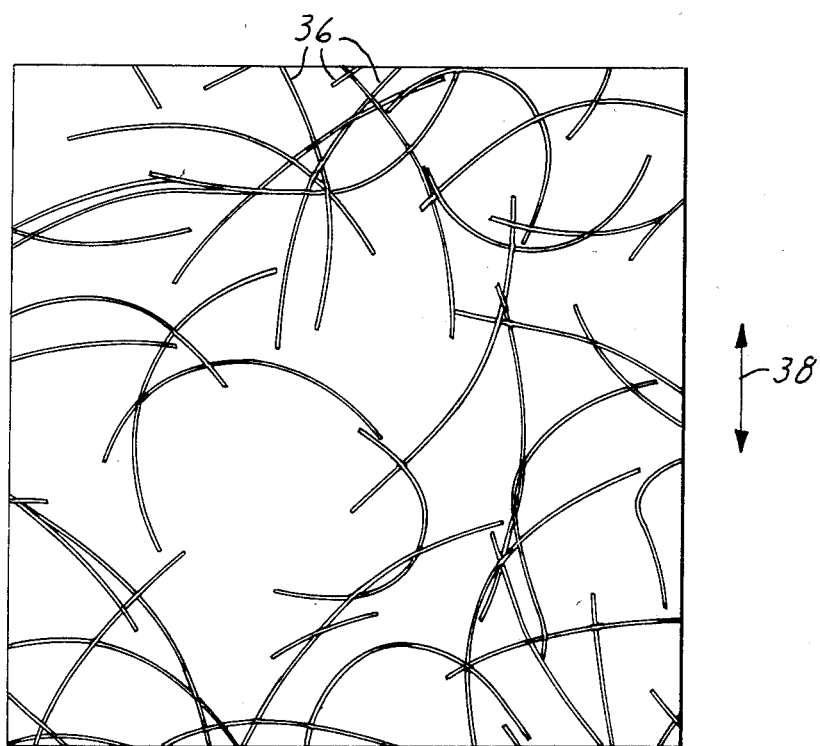

A pressure-sensitive adhesive transfer tape of the prior art has an adhesive layer containing uniformly dispersed glass monofilaments which randomly cross each other but are predominantly oriented in the lengthwise direction of the tape and generally lie in straight lines. In contrast, the monofilaments of the transfer tape of the present invention are organic and have a randomly disposed, individually arcuate configuration as shown in FIG. 2. Unlike the prior tape, the novel tape can have high adhesion and shear values and yet be dispensed from an ordinary adhesive transfer gun.

7 Claims, 2 Drawing Figures

PRESSURE SENSITIVE ADHESIVE TRANSFER TAPE CONTAINING ORGANIC FILAMENTS

TECHNICAL FIELD

This invention concerns pressure-sensitive adhesive transfer tapes, especially those of high performance.

BACKGROUND ART

Pressure-sensitive adhesive transfer tapes are widely used such as for making flying splices in the printing and paper-making industries. Because it is imperative that flying splices should never fail, the transfer tapes used for that purpose would desirably have high performance, i.e., be aggressively adhesive and also have high cohesive strength. Unfortunately, transfer tapes employing high-performance pressure-sensitive adhesives cannot be cleanly dispensed from an ordinary adhesive transfer gun which has no cutting blade. If so used, they would tend to elongate and then snap back to leave excess adhesive both at the broken edge of the transferred strip of tape and also at the orifice of the gun.

Pressure-sensitive adhesive transfer tapes are also put to many uses wherein the tape is die cut. While no problems may be encountered when the cutting edge is sharp and operates against a hard smooth surface, a high-performance pressure-sensitive adhesive may not be cleanly cut if the cutting edge becomes dull or if the undersurface is yielding.

U.S. Pat. No. Re. 24,906 (Ulrich) discloses acrylic pressure-sensitive adhesive tapes made from copolymers of alkyl acrylate having an average of 4–12 carbon atoms in its alkyl group and a minor proportion of a highly polar copolymerizable monomer such as acrylic acid. The alkyl acrylate monomer develops higher cohesive and adhesive strengths when photopolymerized in situ as taught in U.S. Pat. No. 4,181,752 (Martens et al.). Especially high performance has been realized when the alkyl acrylate monomer has been photo cross-linked as taught in U.S. Pat. No. 4,329,384 (Vesley et al.) and U.S. Pat. No. 4,330,590 (Vesley). From the foregoing patents, it is known that a useful pressure sensitive adhesive can be made from 50–100 parts alkyl acrylate monomer having an average of 4–12 carbon atoms in its alkyl group and correspondingly 50–0 parts of copolymerizable monoethylenically-unsaturated monomer.

U.S. Pat. No. 3,062,683 (Kalleberg et al.) discloses pressure-sensitive adhesive transfer tapes which may be made from alkyl acrylate monomer as in the Ulrich, Martens, and Vesley patents, although Kalleberg first polymerizes the monomer and then coats the polymer from solution. Kalleberg was concerned with a tendency for promiscuous adhesive transfer upon unwinding a roll of transfer tape having a releasable backing. This was attributed to the fact that the adhesive layer was coated on a low-adhesion or release type of surface to which it was poorly adhered. Kalleberg dealt with this problem by forming the adhesive layer from a solution containing extruded staple reinforcing fibers, preferably glass, in a free extended state. The fibers may be from 0.6 to 3.8 cm in length, from 1 to 25 micrometers in diameter, and comprise from ½ to 30% by weight of the adhesive layer. Although the fibers randomly cross each other to provide both crosswise and lengthwise reinforcement of the layer, they tend to be predominantly oriented in the lengthwise direction of the tape.

A tape currently being manufactured as taught in the Kalleberg patent by the patent assignee is reinforced with glass monofilaments. Those filaments are predominantly oriented in the lengthwise direction of the tape and generally lie in straight lines. The adhesive layer has much lower performance than do currently marketed adhesive tapes of the Martens and Vesley patents.

DISCLOSURE OF INVENTION

Like a tape of the Kalleberg patent which could employ the acrylic adhesives of the Martens and Vesley patents, the pressure-sensitive adhesive transfer tape of the present invention comprises an adhesive layer which (1) is a polymer of 50–100 parts alkyl acrylate having an average of 4–12 carbon atoms in its alkyl group and correspondingly 50–0 parts of copolymerizable monoethylenically-unsaturated monomer, and (2) contains organic monofilaments which randomly cross each other and are uniformly dispersed in a free extended state. The novel tape differs from the Kalleberg tape in that the monofilaments have a randomly disposed, individually arcuate configuration, comprise from 0.1 to 5 percent by volume of the adhesive layer, and have an average diameter from 5 to 40 micrometers and an average length from 3 to 30 mm.

Although the monofilaments increase the tensile strength of the adhesive layer as they do in the Kalleberg adhesive transfer tape, they surprisingly reduce its tear resistance, a result opposite from what Kalleberg reports. Even when using pressure-sensitive adhesives of the highest performance currently available, the novel tapes can be cleanly dispensed from an ordinary adhesive transfer gun.

To attain the highest performance currently available, the acrylic polymer should be a copolymer of 85–98 parts of the alkyl acrylate and correspondingly 15–2 parts by weight of at least one polar copolymerizable monoethylenically-unsaturated monomer such as acrylic acid, methacrylic acid, itaconic acid, maleic acid, amides of said acids, hydroxyalkyl acrylates, cyanoethyl acrylate, and N-vinyl-2-pyrrolidone, and up to 30 parts by weight of copolymerizable monomer when the pyrrolidone is used. Preferred high-performance pressure-sensitive adhesive transfer tapes of the invention have been made with the copolymers of 90 to 98 parts of isooctyl acrylate and correspondingly 10 to 2 parts by weight of acrylic acid and with a copolymer of 70 parts of isooctyl acrylate and 30 parts by weight of N-vinyl-2-pyrrolidone.

Usually the novel pressure-sensitive adhesive transfer tape has a releasable backing such as a dimensionally stable plastic film having a low-adhesion surface. However, as taught in the above-cited Kalleberg patent, the novel tape may be linerless by employing a pair of disparate adhesive coatings which are chemically different and physically incompatible. See also Kalleberg U.S. Pat. No. 2,889,038. One or both of those coatings may contain monofilaments in randomly disposed, individually arcuate configuration, as taught hereinabove, and one of the coatings may be unreinforced.

The adhesive layer of the novel transfer tape preferably is made by photopolymerization as in the Martens patent and preferably is photocrosslinked as in one of the Vesley patents. Hence, the adhesive layer preferably is made by the steps of (1) providing a solvent-free syrup of alkyl acrylate monomer having a coatable viscosity, such as 300 to 20,000 cps, (2) mixing into the syrup organic monofilaments having an average diameter from 5 to 40 micrometers and an average length from 3 to 30 mm and in an amount providing from 0.1 to 5 percent by volume of the syrup and, if necessary, adding photoinitiator,
(3) coating the mixture onto a releasable backing through an orifice, preferably to a thickness of 0.03 to 2 mm, and
(4) photopolymerizing the coated syrup to a pressure-sensitive adhesive state.

It is not understood why those steps should lead to randomly disposed, individually arcuate configuration of the organic monofilaments. Microscopic examination of the tapes shows very few monofilaments extending generally in the longitudinal direction of the tape, and a somewhat larger proportion extending generally in the crosswise direction. This contrasts to the predominantly longitudinal orientation reported in Kalleberg U.S. Pat. No. 3,062,683.

In an effort to carry out the above four steps using glass monofilaments instead of organic but at the same preferred length (6-7 mm) and amount (0.5 percent by volume of the syrup), the glass filaments tended to clog the coating orifice. Although the glass filaments had an average diameter of only 9 micrometers, their stiffness exceeded that of typical organic monofilaments 5 to 25 micrometers in diameter, and it is believed that their greater stiffness caused the glass filaments to clog the orifice as opposed to the inherently supple nature of organic monofilaments. It is also believed that the supple nature of organic monofilaments causes them to assume the individually arcuate configuration in the adhesive layer of the novel transfer tape.

In step (1) of the above-outlined preferred method of making the novel transfer tape, a coatable viscosity preferably is attained by partially photopolymerizing the monomer, but instead can be attained by mixing the monomer with a thixotropic agent such as fumed silica, followed by the other three steps.

In the current state of the art, photopolymerization of thin coatings is carried out in an inert atmosphere. A sufficiently inert atmosphere can be achieved by covering the photopolymerizable coating with a plastic film which is transparent to ultraviolet radiation, and irradiating through that film in air. If instead of covering the polymerizable coating the photopolymerization is to be carried out in an inert atmosphere, the permissible oxygen content of the inert atmosphere can be increased by mixing into the photopolymerizable composition an oxidizable tin compound as taught in U.S. Pat. No. 4,303,485 (Levens), which also teaches that by doing so, thick coatings can be polymerized in air.

In addition to the ingredients mentioned above, the photopolymerizable monomer mixtures may include certain other materials such as tackifiers and reinforcing agents. However, the addition of any such material adds complexity and hence expense to an otherwise simple, straightforward, economical process and is not preferred except to achieve specific results.

The organic monofilaments of the novel tape preferably have a uniform length from 5 to 10 mm. Above about 20 mm it might be difficult to obtain uniform distribution of the monofilaments when making the novel transfer tape by the above-outlined process. At lengths below about 3 mm, a transfer tape having a high-performance pressure-sensitive adhesive may not be cleanly dispensable from an ordinary adhesive transfer gun.

The monofilaments preferably have a uniform diameter from 10 to 20 micrometers. Above about 25 micrometers the filaments might be too stiff for coating a monomer mixture in the above-outlined process unless the filaments were made from a highly flexible material. It is believed that organic monofilaments below 5 micrometers in diameter are not commercially available.

Preferably the monofilaments comprise from 0.5 to 1.0 percent by volume of the adhesive layer. Above about 2 percent, the filaments might clog an orifice in the above-outlined process. Below about 0.1 percent, a high-performance transfer tape may not be cleanly dispensable from an ordinary adhesive transfer gun.

Organic materials which have been successfully used for the monofilaments include nylon, polyester, polypropylene, acetate, and rayon. Of these, nylon has been most uniformly distributed throughout the adhesive layer.

Glass microbubbles having an average diameter of 10 to 200 micrometers can be blended with photopolymerizable mixtures as taught in U.S. Pat. No. 4,223,067 (Levens). If the microbubbles comprise 20 to 65 volume percent of the pressure-sensitive adhesive, the transfer tape product will have a foam-like appearance and be suitable for uses to which foam-like pressure-sensitive adhesive transfer tapes are put.

Any photoinitiators of the benzoin ether type disclosed in the Martens patent are useful in the present invention including the benzoin ethers (such as benzoin methyl ether or benzoin isopropyl ether), substituted benzoin ethers (such as anisoin methyl ether), substituted acetophenones (such as 2,2-diethoxyacetophenone and 2,2-dimethoxy-2-phenylacetophenone), and substituted alpha-ketols (such as 2-methyl-2-hydroxypropiophenone). They are preferably used in amounts which as dissolved provide about 0.01 to 2 (more preferably from 0.1 to 0.5) parts per 100 parts by weight of total monomer.

THE DRAWING

Figure 1:
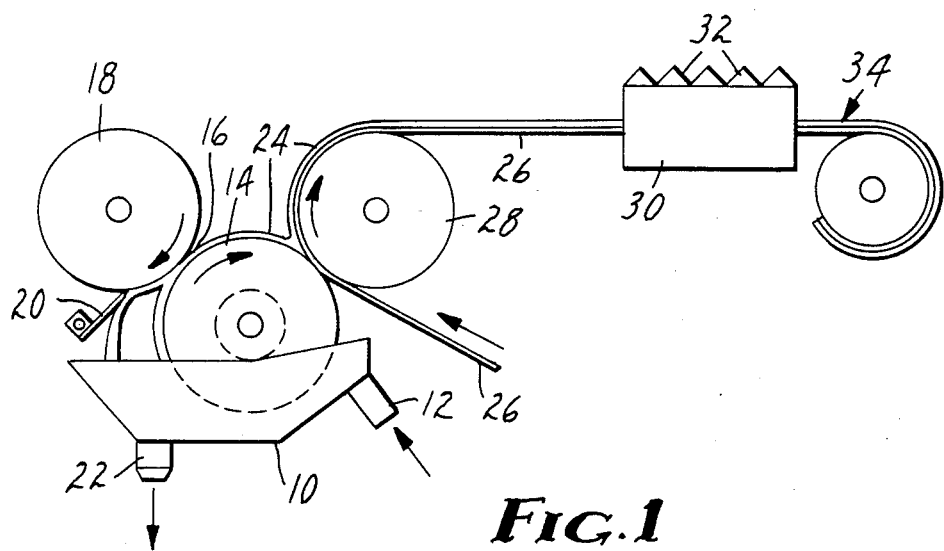

In the drawing,

FIG. 1 schematically illustrates the manufacture of a pressure-sensitive adhesive transfer tape of the invention on a conventional 3-roll reverse roll coater, and FIG. 2 is a tracing of an enlarged photograph of a face of an adhesive transfer tape of the invention.

In FIG. 1, a mixture of organic filaments and polymerizable acrylate monomer is fed into a pan 10 through an inlet 12. A rotating stainless steel casting roll 14 carries the mixture through a narrow orifice 16 between the casting roll and a stainless steel metering roll 18. Excess mixture is removed from the metering roll 18 by a doctor blade 20 and is recirculated through an outlet 22 to the inlet 12.

The thin coating 24 of filament-containing monomer which emerges from the orifice 16 is transferred to a releasable carrier web 26 at a rubber-covered backup roll 28. The web 26 carries the coating into a windowed chamber 30 containing an inert atmosphere where the coating is irradiated by ultraviolet lamps 32 to photopolymerize the monomers to a pressure-sensitive adhesive state. Because both surfaces of the carrier web 26 have low-adhesion properties, the resultant adhesive transfer tape 34 can be wound upon itself for convenient storage and shipment. The carrier web 26 serves as a releasable backing which can be removed when the adhesive layer is put to use.

FIG. 2 shows the face of the adhesive transfer tape 34 of FIG. 1 at a magnification of 15×, each of its organic monofilaments 36 being about 6.4 mm in length. The longitudinal direction of the tape is indicated by the arrow 38.

In the following examples, all parts are by weight unless otherwise noted.

EXAMPLE 1

A mixture of
90 parts of isooctyl acrylate
10 parts of acrylic acid
0.04 part of 2,2-dimethoxy-2-phenylacetophenone (which was obtained as "Irgacure" 651)
was partially photopolymerized in an inert (nitrogen) atmosphere by exposure to ultraviolet radiation to provide a coatable syrup of about 3000 cps Brookfield viscosity. To this was added 0.1 part of "Irgacure" 651, 0.15 part of Photoactive S-triazine B of U.S. Pat. No. 4,330,590 (Vesley), and 0.5% nylon fibers (Mini Fibers, Inc.). The nylon fibers had a uniform diameter of about 19.3 micrometers and a uniform length of 6.4 mm. After being thoroughly mixed, this mixture was coated onto a releasable backing (paper having on each face a silicone coating over a polyethylene coating) using the 3-roll reverse roll coater shown in FIG. 1 to provide a coating 0.125 mm thick. An exposure of about 500 mj as in the aforementioned U.S. Pat. No. 4,330,590 produced a pressure-sensitive adhesive layer which, with the releasable backing, was wound upon itself into roll form. A piece of this transfer tape was used to make the photomicrograph of which FIG. 2 is a tracing.

EXAMPLES 2–10

Other pressure-sensitive adhesive transfer tapes have been made substantially as described in Example 1 except with other organic monofilaments as indicated in the following table.

| Example | Fiber | Diameter (Micrometers) | Length (mm) |
|---|---|---|---|
| 1 | Nylon | 19.3 | 6.4 |
| 2 | Nylon | 15.8 | 6.4 |
| 3 | Nylon | 27.3 | 6.4 |
| 4 | Nylon | 19.3 | 12.7 |
| 5 | Nylon | 19.3 | 19 |
| 6 | Polyester | 17.6 | 6.4 |
| 7 | Polyester | 12.5 | 6.4 |
| 8 | Polypropylene | 21.6 | 6.4 |
| 9 | Acetate | 17.9 | 6.4 |
| 10 | Rayon | 16.8 | 6.4 |

In the adhesive layers of each of the transfer tapes of Examples 2–10, the monofilaments had a randomly disposed, individually arcuate configuration. In each, a somewhat larger proportion appeared to extend generally crosswise than generally lengthwise, but the difference was highly subjective. The arcuate configurations in the tapes of Examples 2, 7, 9 and 10 were indistinguishable from that of Example 1, while the arcuate configurations in the tapes of Examples 3, 6 and 8 were somewhat less pronounced. In the tapes of Examples 4 and 5, the arcuate configurations were similar to that of Example 1 except that the longer monofilaments of Example 4 had a generally U-shaped configuration, and many of the ends of the even longer monofilaments of Example 5 were crossed.

The adhesive layer of each of the transfer tapes of Examples 1–10 was readily torn, indicating that each could be cleanly dispensed from an ordinary adhesive transfer gun. All of the tapes would qualify as high performance transfer tapes, each having high adhesion and shear values that were substantially the same as those of identical tapes except for omission of the monofilaments.

We claim:

1. Pressure-sensitive adhesive transfer tape comprising an adhesive layer which (1) is a polymer of 50–100 parts alkyl acrylate having an average of 4–12 carbon atoms in its alkyl group and correspondingly 50–0 parts of copolymerizable monoethylenically-unsaturated monomer and (2) contains organic monofilaments which randomly cross each other and are uniformly dispersed in a free extended state, wherein the improvement comprises:

the adhesive contains a photoinitiator and the monofilaments have a randomly disposed, individually arcuate configuration, comprise from 0.1 to 5 percent by volume of the adhesive tape, have an average diameter from 5 to 40 micrometers, and have an average length from 3 to 30 mm, whereby said tape is readily dispensable, said adhesive layer being rubbery and difficult to dispense in the absence of said monofilaments.

2. Pressure-sensitive adhesive tape as defined in claim 1 wherein said adhesive tape is supported by a releasable backing.

3. Pressure-sensitive adhesive tape as defined in claim 1 wherein the monofilaments have a substantially uniform length from 5 to 10 mm.

4. Pressure-sensitive adhesive tape as defined in claim 1 wherein the monofilaments have a substantially uniform diameter from 10 to 20 micrometers.

5. Pressure-sensitive adhesive tape as defined in claim 1 wherein the monofilaments comprise from 0.5 to 1.0 percent by volume of the adhesive layer.

6. Pressure-sensitive adhesive tape as defined in claim 1 wherein the monofilaments are nylon.

7. Method of making the pressure-sensitive adhesive transfer tape of claim 1 comprising the steps of (1) providing a solvent-free syrup of alkyl acrylate monomer having a coatable viscosity and containing a photoinitiator, (2) mixing into the syrup organic monofilaments having an average diameter from 5 to 40 micrometers and an average length from 3 to 30 mm and in an amount providing from 0.1 to 5 percent by volume of the syrup, (3) employing a 3-roll reverse coater comprising a casting roll, a metering roll, and a backup roll to coat the mixture onto a releasable backing through an orifice between the casting roll and the metering roll to a thickness of 0.03 to 2 mm, and (4) photopolymerizing the coated syrup to a pressure-sensitive adhesive state.

* * * * *